United States Patent
Shingleton et al.

(10) Patent No.: US 7,807,918 B2
(45) Date of Patent: Oct. 5, 2010

(54) MODULAR SHADE SYSTEM

(75) Inventors: Jefferson G. Shingleton, Auburn, NY (US); Elise R. Brewster, Berkeley, CA (US); Thomas L. Dinwoodie, Piedmont, CA (US); Gianluigi Mascolo, Danville, CA (US)

(73) Assignee: SunPower Corporation, Systems, Berkeley, CA (US)

( * ) Notice: Subject to any disclaimer, the term of this patent is extended or adjusted under 35 U.S.C. 154(b) by 969 days.

(21) Appl. No.: 10/796,299

(22) Filed: Mar. 9, 2004

(65) Prior Publication Data

US 2004/0261955 A1 Dec. 30, 2004

Related U.S. Application Data

(60) Provisional application No. 60/453,637, filed on Mar. 10, 2003, provisional application No. 60/517,574, filed on Nov. 5, 2003.

(51) Int. Cl.
*H01L 31/00* (2006.01)
(52) U.S. Cl. .......................................... 136/243; 52/519
(58) Field of Classification Search ................. 136/244, 136/246, 251, 245; 220/581
See application file for complete search history.

(56) References Cited

U.S. PATENT DOCUMENTS

| 2,873,698 A | * | 2/1959 | Hartman et al. ................. 52/11 |
| 3,565,719 A | | 2/1971 | Webb |
| 4,106,952 A | * | 8/1978 | Kravitz ....................... 136/206 |
| 4,153,813 A | * | 5/1979 | Blieden et al. .............. 136/247 |
| 4,184,476 A | * | 1/1980 | McArthur .................... 126/632 |
| 4,233,085 A | * | 11/1980 | Roderick et al. ............ 136/244 |
| 4,429,178 A | | 1/1984 | Prideaux et al. |
| 4,611,090 A | * | 9/1986 | Catella et al. ............... 136/251 |
| 4,663,495 A | * | 5/1987 | Berman et al. .............. 136/248 |
| 4,692,557 A | * | 9/1987 | Samuelson et al. .......... 136/251 |
| 5,505,788 A | | 4/1996 | Dinwoodie |

(Continued)

FOREIGN PATENT DOCUMENTS

JP 10002063 A * 1/1998

(Continued)

OTHER PUBLICATIONS

Dictionary.com definitions of "solar panel" and "solar cell".*

(Continued)

*Primary Examiner*—Alexa D Neckel
*Assistant Examiner*—Miriam Berdichevsky
(74) *Attorney, Agent, or Firm*—James F. Hann; Haynes Beffel & Wolfeld LLP

(57) ABSTRACT

A modular shade system comprises a support structure supporting modular panels. The support structure defines a first area having a length and a width. The modular panels have upper, exposed surfaces and lower surfaces and are mounted to and supported by the support structure. The modular panels cover at least about 80% of the first area. The modular panels comprise PV panels and supplemental panels, the supplemental panels providing a feature other than shading and optionally providing shading. Protective panels may be mounted opposite the lower surfaces of the PV modules. A protective panel may so be used when the PV module is part of an installation other than a modular shade structure.

19 Claims, 5 Drawing Sheets

U.S. PATENT DOCUMENTS

| | | | | |
|---|---|---|---|---|
| 5,520,747 | A * | 5/1996 | Marks | 136/245 |
| 5,776,262 | A | 7/1998 | Melchior | |
| 5,885,367 | A * | 3/1999 | Brown et al. | 136/245 |
| D408,554 | S | 4/1999 | Dinwoodie | |
| 5,968,287 | A * | 10/1999 | Nath | 136/251 |
| 6,058,930 | A | 5/2000 | Shingleton et al. | |
| 6,130,781 | A * | 10/2000 | Gauvin | 359/591 |
| 6,218,609 | B1 * | 4/2001 | Mori et al. | 136/259 |
| 6,341,451 | B1 | 1/2002 | Morton, Sr. | 52/64 |
| 6,367,573 | B1 * | 4/2002 | Scott | 180/314 |
| 6,399,874 | B1 | 6/2002 | Olah | 136/259 |
| 6,415,557 | B1 * | 7/2002 | McCalley | 52/79.1 |
| 6,489,552 | B2 * | 12/2002 | Yamawaki et al. | 136/251 |
| 6,606,823 | B1 * | 8/2003 | McDonough et al. | 47/65.9 |
| 6,702,370 | B2 * | 3/2004 | Shugar et al. | 296/211 |
| 7,069,704 | B2 * | 7/2006 | Pendley | 52/749.12 |
| 7,099,169 | B2 * | 8/2006 | West et al. | 363/132 |
| 2001/0036024 | A1 | 11/2001 | Wood | |
| 2001/0050101 | A1 * | 12/2001 | Makita et al. | 136/244 |
| 2003/0005954 | A1 | 1/2003 | Emoto et al. | |
| 2005/0061311 | A1 * | 3/2005 | Christensen | 126/629 |

FOREIGN PATENT DOCUMENTS

| | | | | |
|---|---|---|---|---|
| JP | 2002030774 A * | 1/2002 | | 136/243 |
| WO | WO 00/31477 | 6/2000 | | |

OTHER PUBLICATIONS

Yoshia, A. JP 2002030774A, Jan. 31, 2002, machine translation.*

* cited by examiner

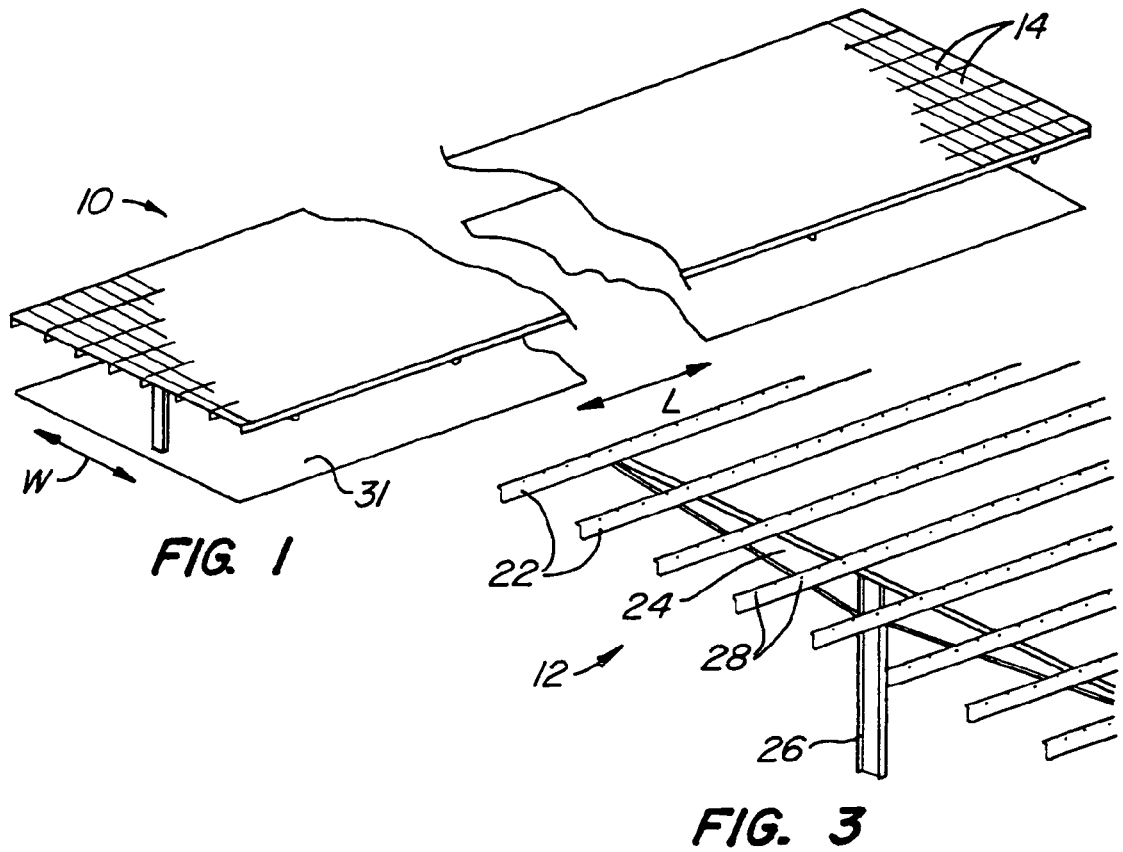
FIG. 1
FIG. 3
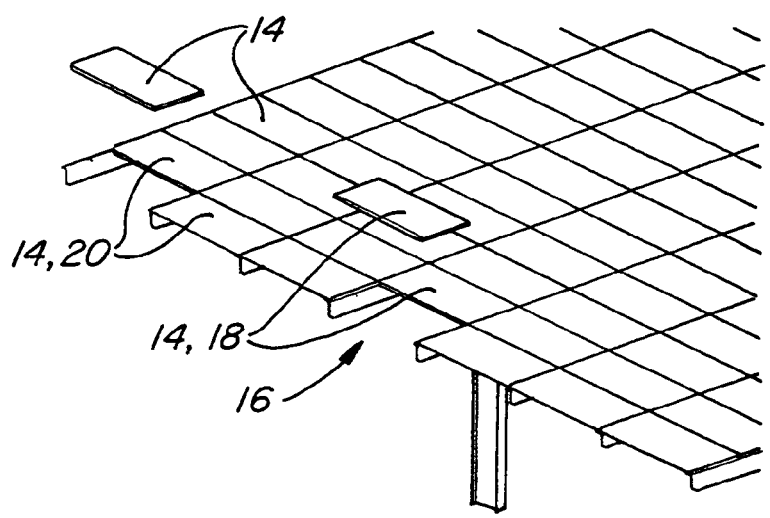
FIG. 2

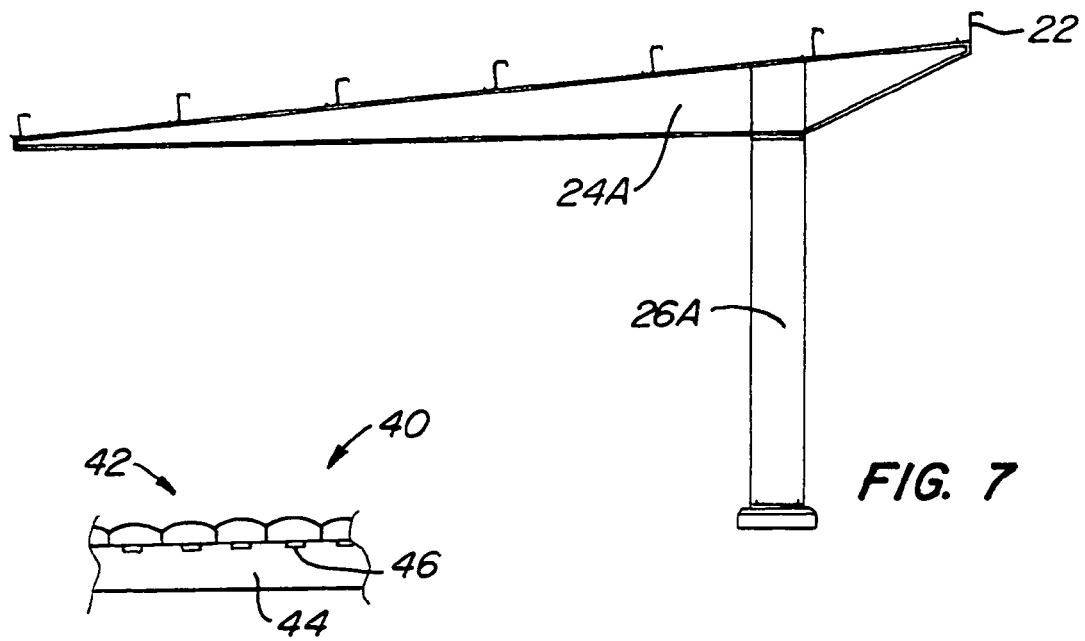
FIG. 7
FIG. 6
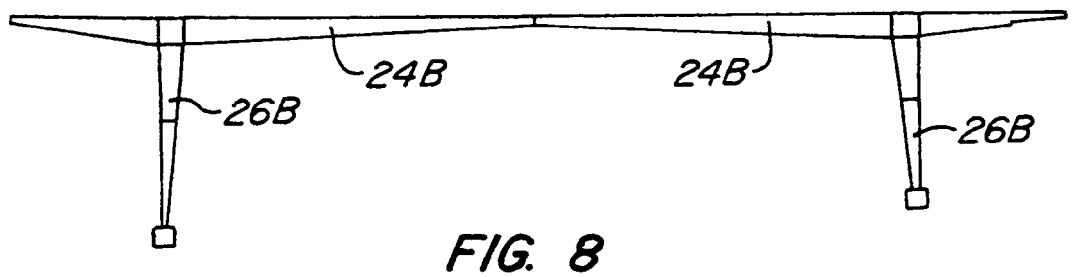
FIG. 8
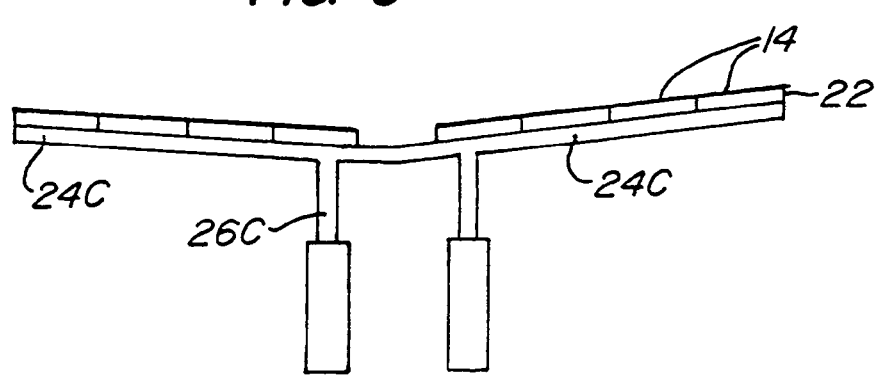
FIG. 9

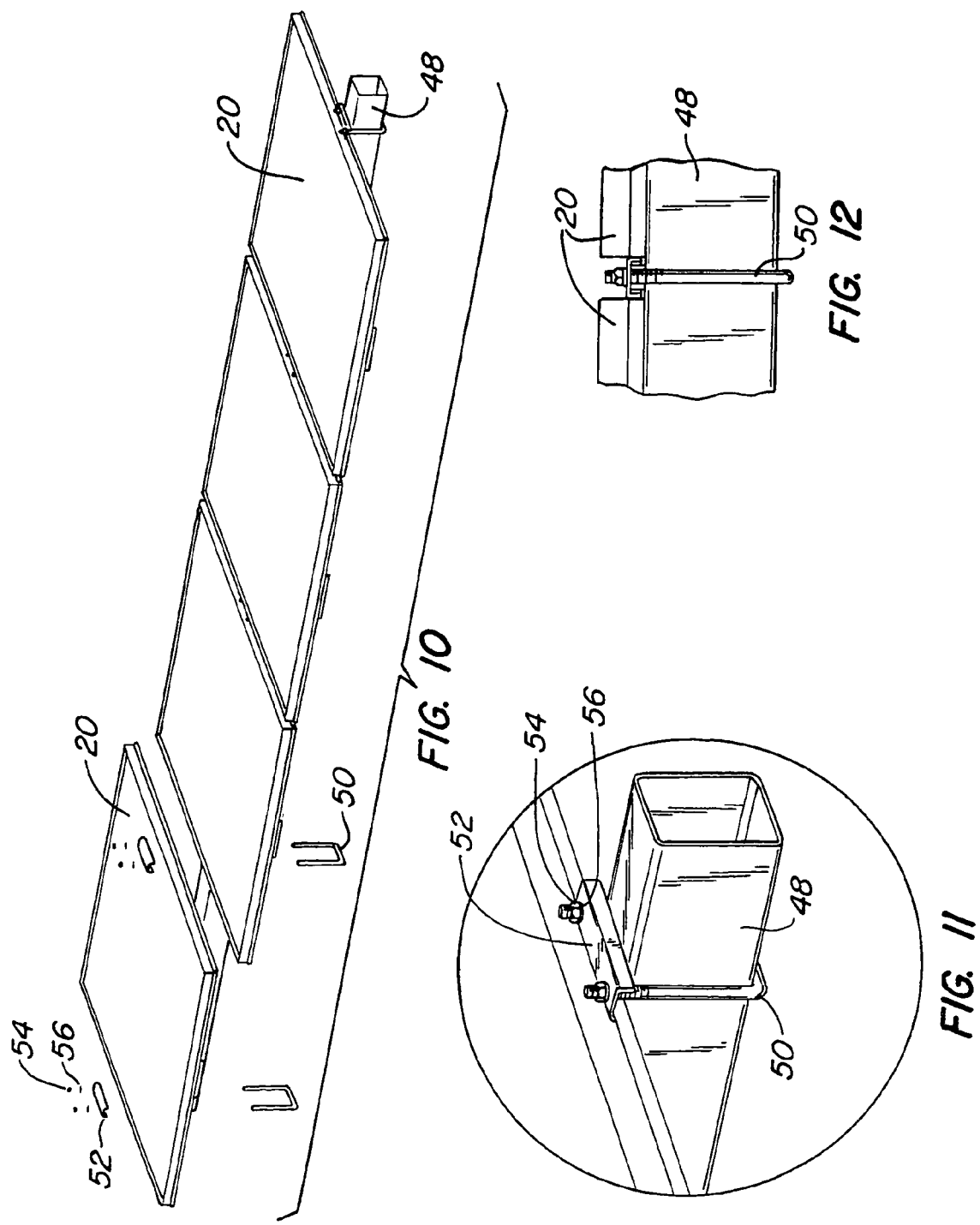

MODULAR SHADE SYSTEM

CROSS-REFERENCE TO OTHER APPLICATIONS

This application claims the benefit of U.S. provisional patent application No. 60/453,637 filed on 10 Mar. 2003 and U.S. provisional patent application No. 60/517,574 filed on 5 Nov. 2003. This application is related to U.S. design patent application Ser. No. 29/177,528 filed on 10 Mar. 2003. This application is also related to U.S. patent application Ser. No. 10/796,582 entitled Modular Shade System With Solar Tracking Panels, filed on the same day as this application.

BACKGROUND OF THE INVENTION

To improve the quality and economic value of outdoor spaces, it is desirable to develop means to provide low-cost, multi-use structures, to facilitate such things as mounting for electricity generating PV modules, shade for cars, shade for outdoor activities, agriculture, aquaculture, and to promote other purposes and events. Ancillary advantages from green roofs, also called vegetative roof coverings or eco-roofs, include controlling water runoff and reducing subsequent water pollution from buildings, parking lots and other structures.

In addition, the economic feasibility of photovoltaic (PV) power systems and the need for distributed power generation at the point of use has lead to an increasing world market for grid-connected PV systems. Many times in areas where PV is most economically attractive, open land for PV installation is scarce or nonexistent. There is, therefore, a need to incorporate PV power generating systems in urban areas where land is not readily available. Target areas include parking lots, roadways, parks, campuses, watersheds, reservoirs, canals, open areas adjacent to buildings, and other open areas.

BRIEF SUMMARY OF THE INVENTION

The present invention is directed to a modular shade system comprising a support structure supporting modular panels. The support structure defines a first area having a length and a width. The modular panels have upper, exposed surfaces and lower surfaces and are mounted to and supported by the support structure. The modular panels cover at least about 80% of the first area. The modular panels comprise PV panels and supplemental panels, the supplemental panels providing a feature other than shading and optionally providing shading. The modular panels may comprise light-transmissive panels. Protective panels may be mounted to the shading system subassembly opposite the lower surfaces of the PV modules.

A second aspect of the invention is directed to photovoltaic assembly comprising a mounting structure, a PV module, having upper and lower surfaces, supported by the mounting structure, and a protective panel mounted to at least one of the mounting structure and the PV module opposite the lower surface of the PV module.

Various features and advantages of the invention will appear from the following description in which the preferred embodiments have been set forth in detail in conjunction with the accompanying drawings.

BRIEF DESCRIPTION OF THE DRAWINGS

FIG. 1 is a top, a front, left side isometric view of a shade system made according to the invention in which the top of the system is covered by an array of modular panels;

FIG. 2 is an enlarged view of a portion of FIG. 1 illustrating two different modular panels, that is a PV panel and a tinted transparent panel, spaced apart from the support structure;

FIG. 3 illustrates the structure of FIG. 2 with the modular panels removed leaving the support structure, including purlins, transverse beams supporting the purlins and columns supporting the beams;

FIG. 6 is a simplified side view of a light concentrator type of PV panel;

FIGS. 7 and 8 illustrate alternative embodiments of the support structure of FIG. 5;

FIG. 9 illustrates an alternative embodiment of the shade system of FIG. 5;

FIG. 10 is an overall view of alternative embodiment of the invention in which tubular purlins are used instead of the Z-shaped purlins of FIG. 4;

FIGS. 11 and 12 are enlarged views of portions of the embodiment of FIG. 10 illustrating the attachment of the PV panels to the purlins;

DESCRIPTION OF THE SPECIFIC EMBODIMENTS

Figure 4:
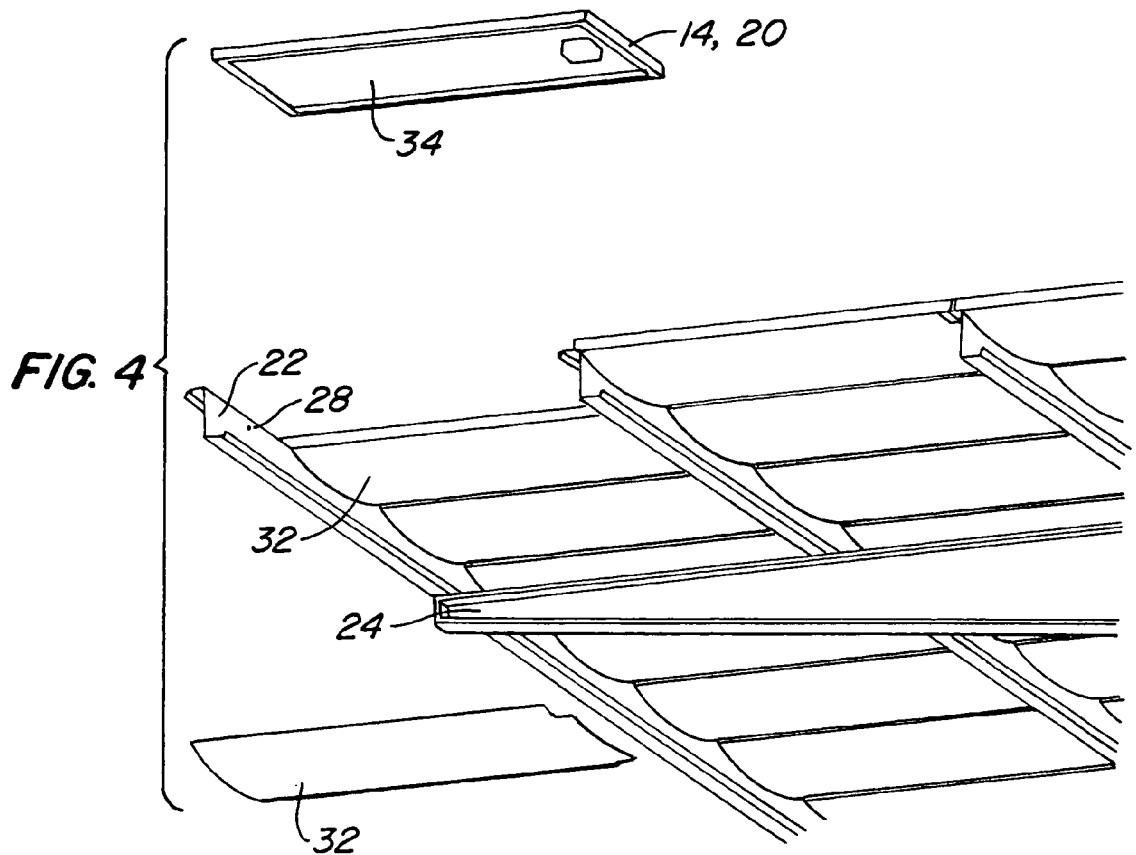
FIG. 4 is an enlarged bottom, front, left side isometric view of a portion of the shade system of FIG. 1 with the end caps removed to show the Z-cross-sectional shape of the purlins, and showing a modular panel and a protective panel spaced apart from the support structure.

FIGS. 1-5 illustrate the basic components of shade system 10. Shade system 10 comprises a support structure 12, shown best in FIGS. 3 and 4, to which an array of modular panels 14 are mounted. In one embodiment the center row 16 of modular panels 14 are tinted, transparent panels 18 provided to create an illuminated walkway along the length of shade system 10. The tinting of transparent panels 18, such as red, also provides a distinctive, aesthetically pleasing aspect to the shade system. In this embodiment the remainder of modular panels 14 are PV panels 20 so that shade system also acts as a source of electricity. Electricity could be used for a variety of purposes including charging batteries, creating hydrogen from water, or after being transformed into alternating current, fed into the commercial electrical grid. The modular panels 14 could also include to other types of modular structures such as planter modules used for growing plants on the top of shade system 10, skylight panels, mounting modules for supporting structures such as flags, antennas and cellular repeaters. The modular panels 14 could also be phosphorescent to provide passive nighttime illumination. In addition, modular panels 14 could be illuminated panels for active nighttime illumination beneath shade system 10.

Modular panels 14 may include a number of different structures, including the following: water collection containers; space cooling elements comprising at least one of spray misters for evaporative cooling, fans, pumps, wetted canvas, water storage containers, tubing, and evaporative spouts and elements for water collection and drainage. Modular panels 14 may also include modular features for multi-functionality and customization such as: acoustical control panels, seating elements, planting elements, playground elements, restroom elements, signage elements, antennae modules, payment machines, stage elements, rail transportation elements, fuel cell charging systems, hydrogen production devices, hydrogen storage devices, inverters for converting dc to ac electricity, electrical wireways, and elements which facilitate roller skating, ice skating, car shows, horse riding, housing the homeless, farmers markets, soccer matches, tennis matches, concerts, lightshows, fitness, and transportation nodes.

Support structure 12 includes a series of parallel purlins 22 mounted to and supported by transverse beams 24, the beams being supported by vertical columns 26. Purlins 22, in this embodiment, have holes 28 formed therein to facilitate mounting of panels 14. Support structure 12 is preferably designed to orient modular panels 14 at an angle 30 to enhance solar power efficiency and resistance to wind uplift, typically a 1-12 slope or 4.76 degrees.

Purlins 22 define a first shading area 31, see FIG. 1, vertically beneath the purlins. Area 31 has a length L and a width W. PV panels 20 and transparent panels 18 preferably cover at least about 90% of first shading area 31. In the embodiment of FIG. 1, 100% of first shading area 31 is covered by transparent panels 18 and PV panels 20. Transparent panels 18, or other light-transmissive panels, may cover about 0-50% of first shading area 31, and preferably about 5-30% of the first shading area.

When modular panels 14 are PV panels 20, a protective panel 32 is preferably used to cover the lower surface 34 of the PV panel. This helps prevent against both vandalism and inadvertent damage to the PV panels. Protective panel 32 is, in this embodiment, convex when viewed from below. The convex design provides high-strength with relatively thin material. Also, protective panel 32 is perforated, such as to the use of a perforated plastic material or a metal mesh, or is otherwise designed to provide ventilation for PV panel 20. In addition, when PV panel 20 is of the type that allows an amount, typically a small amount, of light to pass therethrough, making protective panel 32 light-transmissive, such as providing perforations or making the panel of light transmitting material, helps to illuminate the region beneath shade system 10. Protective panels 32 may be made of, for example, at least one of wire mesh, sheet metal, perforated sheet metal, plastic, perforated plastic, cement board, perforated cement board, and phosphorescent material. Protective panels 32 may also be used when PV panels 20 are used in other installations and not part of a shade structure, such as when PV panel 20 is used with a skylight in a building roof.

The subject invention constitutes a unique structure suitable for carports, pavilions, and other appropriate situations. The invention be used at gathering places for education, music concerts, farmers' markets, shaded parking/walkways. Shaded parking increases the life of the car's finish and reduces CO2 emissions from the car components breaking down in UV. Also, shaded parking keeps cars cooler and more comfortable. Clean, renewable electricity can be created incorporating multiple PV panels 20; PV panels 20 can be mountable at an optimal angle for both electrical and wind performance. Shade system 10 is suitable for many functional uses and the modularity and flexibility of the design allows significant customization to fit the needs of many different situations. Special elements allow natural lighting of walkways and resistance to breakage by vandalism. The invention provides several possibilities: potential H2 fuel station; potential fuel cell distributed generation port; potential use as a greenhouse or nursery for plant cultivation; potential used as a platform for tracking photovoltaic systems.

The above disclosed embodiments disclose the use of conventional PV panels 20. If desired, PV panels 20 could be of the light concentrator type. Light concentrator types of PV panels 40, see FIG. 6, typically have an array of lenses 42 or other light concentrators positioned above the PV substrate 44 so to increase the intensity of the light received by the PV substrate. This permits the percentage of the active, electricity-generating area 46 of the PV substrate to be reduced when compared with non-light-concentrator types of PV substrates. This helps to make using more efficient electricity-generating materials on the PV substrate more cost-effective.

Figure 5:
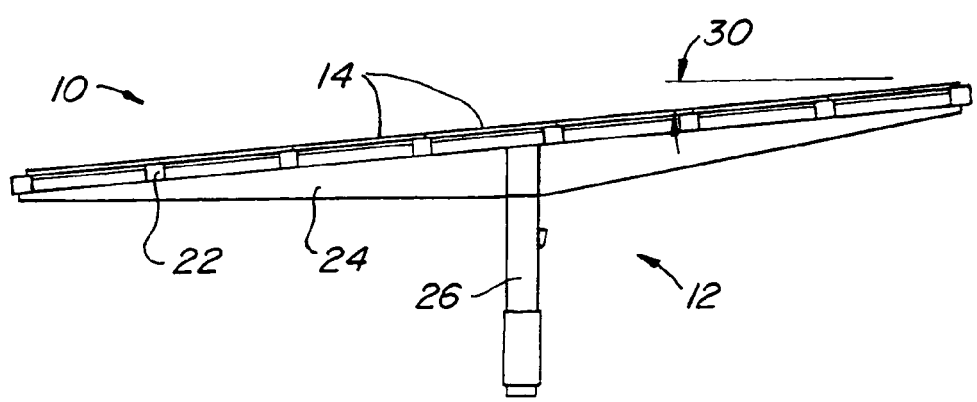
FIG. 5 is an enlarged end view of the shade system of FIG. 1 illustrating the 1:12 inclination of the modular panels.

FIG. 7 illustrates an alternative embodiment of the support structure illustrated in FIG. 5 in which beams 24A extend much farther to one side of column 26A than the other. FIG. 8 illustrates an embodiment in which beams 24B along one row are extended to meet the beams 24B along an adjacent row. The embodiment of FIG. 9 illustrates a further embodiment in which beams 24C of two adjacent rows are joined to one another with the beams angled in a manner so that modular panels 14 along both rows are angled downwardly towards the joined, central area of the rows.

FIG. 10 illustrates a further embodiment in which the Z-shaped purlins 22, shown best in FIG. 4, are replaced by tubular purlins 48, in this case square tubular purlins. PV panels 20 are shown secured to tubular purlins 48 using U-bolts 50, U-channels 52, nuts 54 and washers 56. Tubular purlins 48 have several advantages. First, tubular purlins 48 may serve as wire conduit to contain the wiring. Second, tubular purlins 48 may serve as water conduit for fire protection. Third, tubular purlins 48 are not subject to lateral torsional buckling under load. As such they do not generally require lateral bracing, so the amount of structural material is reduced, the connection complexity is simplified, and the part count is reduced.

Figure 13:
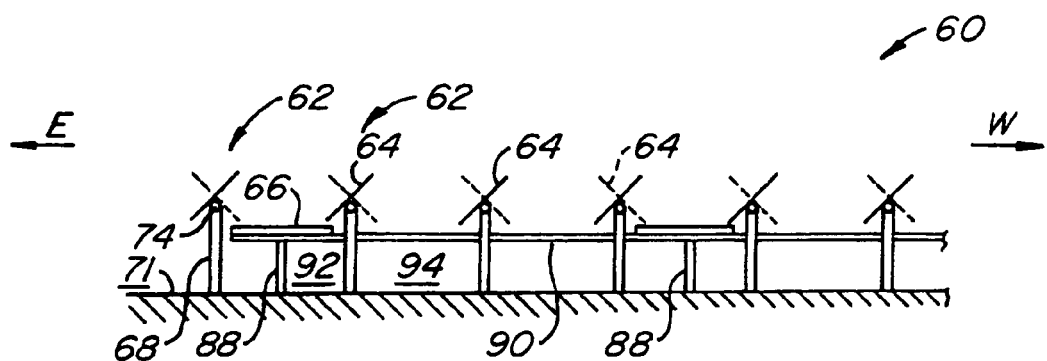
FIG. 13 is a simplified South-facing end view of a modular shade system with solar tracking panels made according to the invention.
Figure 14:
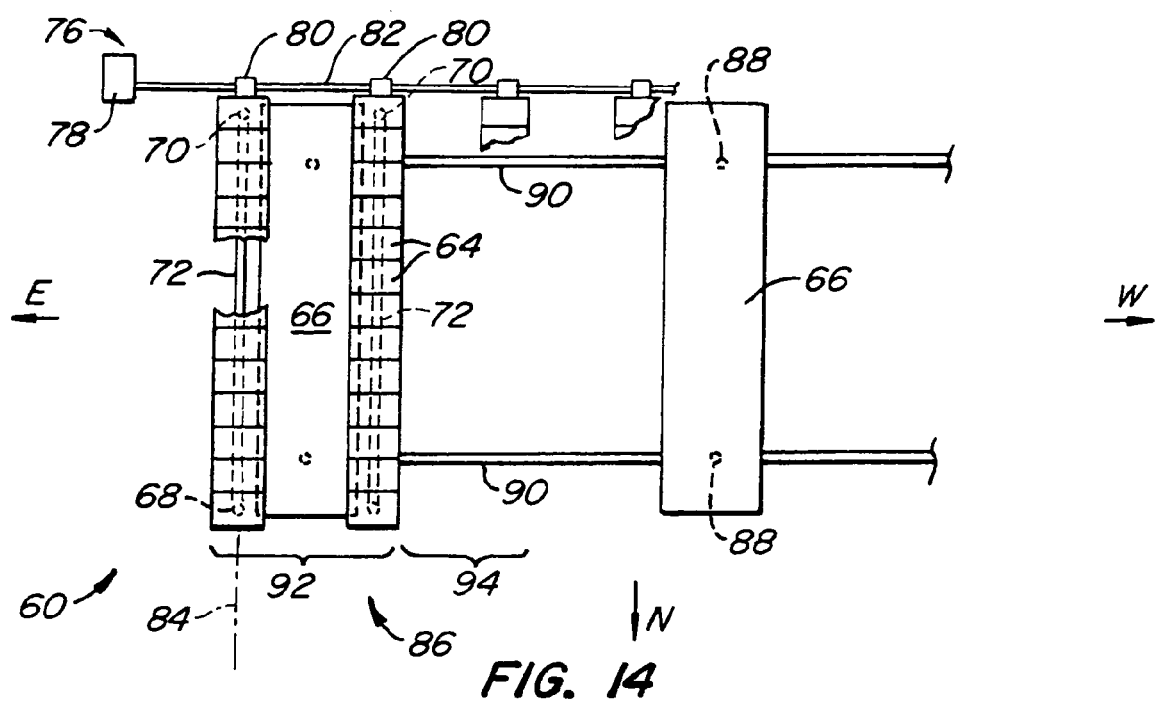
FIG. 14 is a simplified plan view of the system of FIG. 13 showing only some of the rows of panels for simplicity of illustration.
Figure 15:
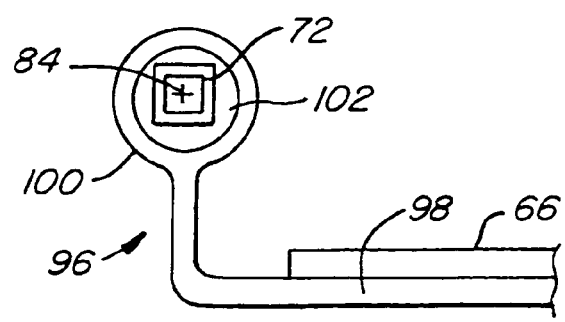
FIG. 15 shows an alternative embodiment of the shade structure mounting assembly of FIGS. 13 and 14.

FIGS. 13-15 illustrates a further embodiment of the invention. The modular shade system 60 incorporates rows 62 of tracking solar panels 64 and shade structures 66 located between at least some of rows 62. Each row 62 comprises a North Side support 68, a Southside Support 70 and a torque tube 72 extending therebetween. Additional supports may be used between supports 68, 70. Torque tube 72 is mounted to supports 68, 70 by pivot connectors 74 to permit rows 62 of solar panels 64 to be pivoted between morning and evening orientations illustrated as the solid line and dashed line orientations in FIG. 13. System 60 also includes a tilting assembly 76. Tilting assembly 76 includes a driver 78 and a drive element 80 associated with each row 62. Drive element 80 of rows 62 are coupled to one another by a drive element coupler 82. Driver 78 is connected to, in this embodiment, the drive element 80 at the end of the East-most row 62 so that actuation of driver 78 causes each drive element 82 to rotate its associated torque tube 72 about its torque tube axis 84 so that panels 64 for each row 62 pivot in unison. This type of solar tracking arrangement is shown in U.S. Pat. No. 6,050,930 and provisional patent application Nos. 60/455,649 and 60/530,384.

Modular shade system 60 also includes a shade assembly 86. Shade assembly 86 includes the shade structures 66, shade structure support posts 88 and shade structure support bars 90 supported by posts 88. Support bars 90 extend in generally East-West directions beneath rows 62 of panels 64 and are used to support shade structures 66. The combination of shade structures 66 and the adjacent rows 62 of panels 64 create enhanced shade regions 92, which may be used for various purposes, including parking stalls. While shade structures 87 may be used between each row 62 of panels 64, the additional shading provided by such a configuration may not be needed or desirable. For example, one or more regions 94 between rows 62 of panels 64 may not be provided with shade structure 87 when regions 94 are to be used, for example, as traffic lanes or as strips for growing shrubs or trees or other plants.

An alternative to use of support bars 90 and support posts 88 is illustrated in FIG. 15. Shade structure hangars 96 are used to suspend shade structures 87 from torque tubes 72. Hangars 96 includes a generally horizontal central part 98 and a generally vertical arm 100 at either end of central part 98. Each arm 100 includes a bearing 102 which engages torque tube 72 and permits torque tube 72 pivot freely about its axis 84 while supporting hangars 96.

Modification and variation can be made to the disclosed embodiments without departing from the subject of the invention. For example, instead of rows 62 of solar panels 64, other types of panels, as discussed above, may also be used. One or more rows of stationery, non-tracking panels may be used with rows 62 of tracking panels 64. Shade structures 66 may comprise, for example, planted areas for living plants to a control water runoff.

Any and all patents, applications, and printed publications referred to above are incorporated by reference.

The invention claimed is:

1. A modular shade system comprising:
   a support structure, supportable by a support surface, defining an elevated, generally horizontal first area having a length and a width, the first area having a periphery;
   a planar array of modular panels, having upper and lower surfaces, mounted to and supported by the support structure at the first area to form the shade system, the modular panels covering at least about 80% of the first area, the upper surfaces of the modular panels being exposed surfaces;
   the shade system being a wall-less shade system having open side regions extending downwardly from the periphery of the first area;
   the modular panels comprising PV panels acting as a source of electricity and supplemental panels;
   a separate protective panel for each of the PV panels, the protective panels mounted to the shading system opposite and covering substantially the entire lower surfaces of each of the PV panels, the protective panels comprising at least one of a wire mesh and a sheet of material, the modular shade system defining open regions below the protective panels;
   the protective panels being spaced apart from the lower surfaces of the PV panels to define open regions therebetween; and
   the supplemental panels being other than PV panels and optionally providing shading.

2. The system according to claim 1 wherein the support structure comprises:
   a series of generally parallel purlins supporting the modular panels;
   beams located beneath the purlins and oriented transversely to said purlins, the purlins secured to and supported by the beams; and
   a generally vertical column secured to and supporting each of said beams.

3. The system according to claim 1 wherein the supplemental panels comprise light-transmissive panels and wherein light-transmissive panels cover about 0 to 50% of the first area.

4. The system according to claim 1 wherein the supplemental panels comprise light-transmissive panels and wherein light-transmissive panels cover about 5 to 30% of the first area.

5. The system according to claim 1 wherein the supplemental panels comprise light-transmissive panels and wherein the light-transmissive panels are placed adjacent to one another along a path parallel to the length.

6. The system according to claim 1 wherein the PV panels comprise light-transmissive PV panels.

7. The system according to claim 1 wherein the supplemental panels comprise light-transmissive panels and wherein the PV panels and light-transmissive panels cover at least about 90% of the first area.

8. The system according to claim 1 wherein the protective panels comprise at least one of sheet metal, perforated sheet metal, plastic, perforated plastic, cement board, perforated cement board, and phosphorescent material.

9. The system according to claim 1 wherein at least some of the modular panels are constructed to permit some light to pass therethrough.

10. The system according to claim 1 wherein the protective panels have a lower protective panel surface, at least substantially the entire lower protective panel surface being convex.

11. The system according to claim 1 wherein the protective panels comprise ventilating perforations to provide ventilation for the PV panels.

12. The system according to claim 1 wherein the PV panels cover at least about 90% of the first area.

13. The system according to claim 1 wherein the supplemental panels comprise phosphorescent panels to provide passive nighttime illumination beneath the shade system.

14. The system according to claim 1 wherein the supplemental panels comprise planter panels for planting of plants.

15. A photovoltaic assembly comprising:
   a mounting structure supportable by a support surface;
   PV modules having upper and lower surfaces and supported by the mounting structure;
   a separate protective panel for each of the PV modules, the protective panels mounted to at least one of the mounting structure and the PV modules opposite and covering substantially the entire the lower surfaces of the PV modules, the protective panels comprising at least one of a wire mesh and a sheet of material, the photovoltaic assembly defining open regions below the protective panels; and
   the protective panels being spaced apart from the lower surfaces of the PV panels to define open regions therebetween.

16. The system according to claim 15 wherein the protective panel comprises at least one of sheet metal, perforated sheet metal, plastic, perforated plastic, cement board, perforated cement board, and phosphorescent material.

17. The system according to claim 15 wherein the PV module and the protective panel are constructed to permit some light to pass therethrough.

18. The system according to claim 15 wherein the protective panel has a lower protective panel surface, at least substantially the entire lower protective panel surface being convex.

19. The system according to claim 15 wherein the protective panel comprises ventilating perforations to provide ventilation for the PV module.

* * * * *